United States Patent [19]
Freiheit

[11] 3,916,496
[45] Nov. 4, 1975

[54] VALVE ASSEMBLY
[75] Inventor: Frederick E. Freiheit, East Lansing, Mich.
[73] Assignee: FMC Corporation, San Jose, Calif.
[22] Filed: Feb. 25, 1974
[21] Appl. No.: 445,755

Related U.S. Application Data
[62] Division of Ser. No. 309,553, Nov. 24, 1972, Pat. No. 3,830,255.

[52] U.S. Cl................................ 29/157.1 R; 29/520
[51] Int. Cl....................... B21d 53/10; B23p 11/00
[58] Field of Search...................... 29/157.1 R, 520; 137/543.19, 533.19, 539

[56] References Cited
UNITED STATES PATENTS

| | | | |
|---|---|---|---|
| 1,579,875 | 4/1926 | Lundberg............................. | 29/520 |
| 1,829,972 | 11/1931 | Wiley.................................... | 29/520 |
| 2,563,992 | 8/1951 | DeGrave............................... | 29/520 |
| 2,649,277 | 8/1953 | Blackford ..................... | 137/543.19 |
| 2,918,083 | 12/1959 | Clark, Jr. et al............... | 137/543.19 |
| 2,985,342 | 5/1961 | Focht.................................... | 29/520 |
| 3,084,709 | 4/1963 | Flick et al...................... | 137/543.19 |

FOREIGN PATENTS OR APPLICATIONS

| | | | |
|---|---|---|---|
| 968,435 | 11/1950 | France........................... | 137/543.19 |
| 1,456,510 | 9/1966 | France........................... | 137/543.19 |
| 467,156 | 6/1937 | United Kingdom................. | 137/539 |
| 851,504 | 10/1960 | United Kingdom............ | 137/533.19 |

OTHER PUBLICATIONS

Nelson, M. D., *The Shape of Ball Check Valves* from *Product Engineering*, Vol. 33, No. 95, Dec. 10, 1962, pp. 98, 99.

*Primary Examiner*—C. W. Lanham
*Assistant Examiner*—Dan C. Crane
*Attorney, Agent, or Firm*—C. E. Tripp; A. J. Moore

[57] ABSTRACT

A valve assembly having a machined valve seat with a stamped cage press fitted on the seat. In one embodiment a disc valve is urged against the valve seat by a variable rate conical spring having its large end engaging the valve disc and its small end encircling a flange on a spring retainer held in place by a snap ring engaging surfaces of the cage windows. The spring when compressed nests about the retaining flange in less space than two wire diameters of the spring providing a short valve with high lift and high flow rate. In a second embodiment, flanges pressed inwardly to form the valve cage windows are used to guide a ball type valve.

1 Claim, 6 Drawing Figures

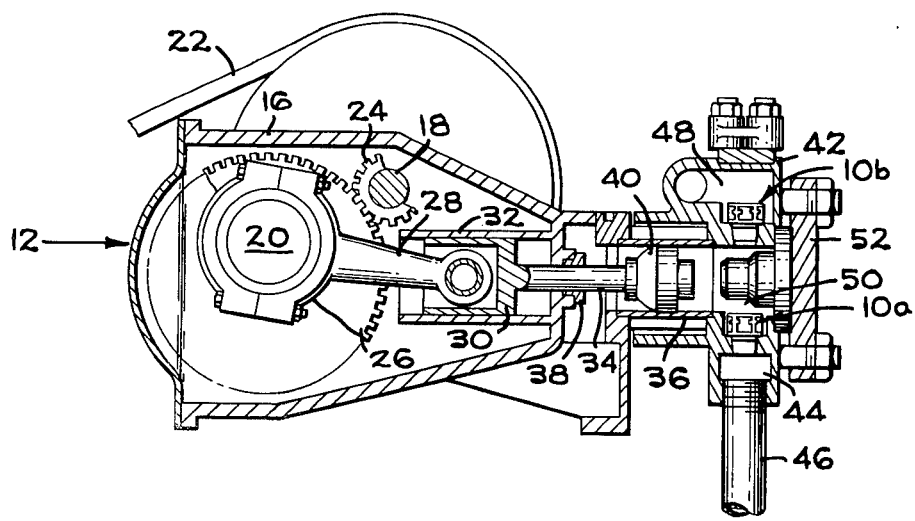
FIG_1
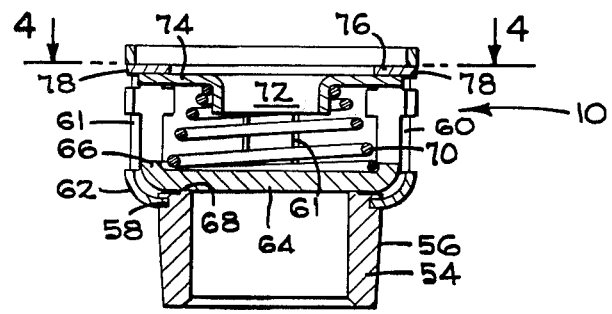
FIG_2
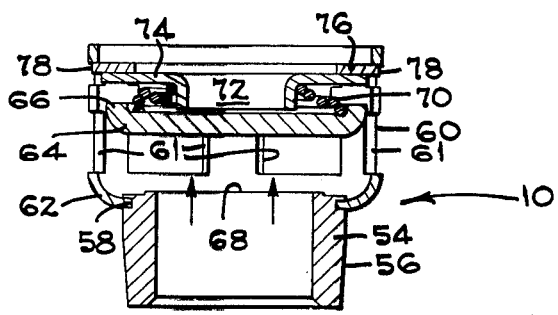
FIG_3

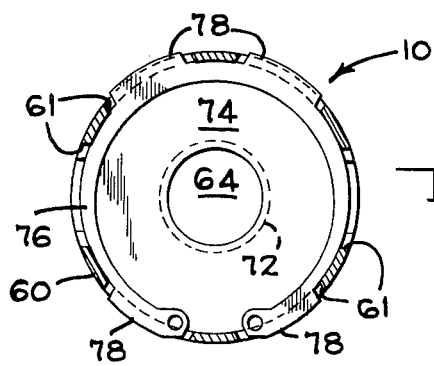
FIG_4
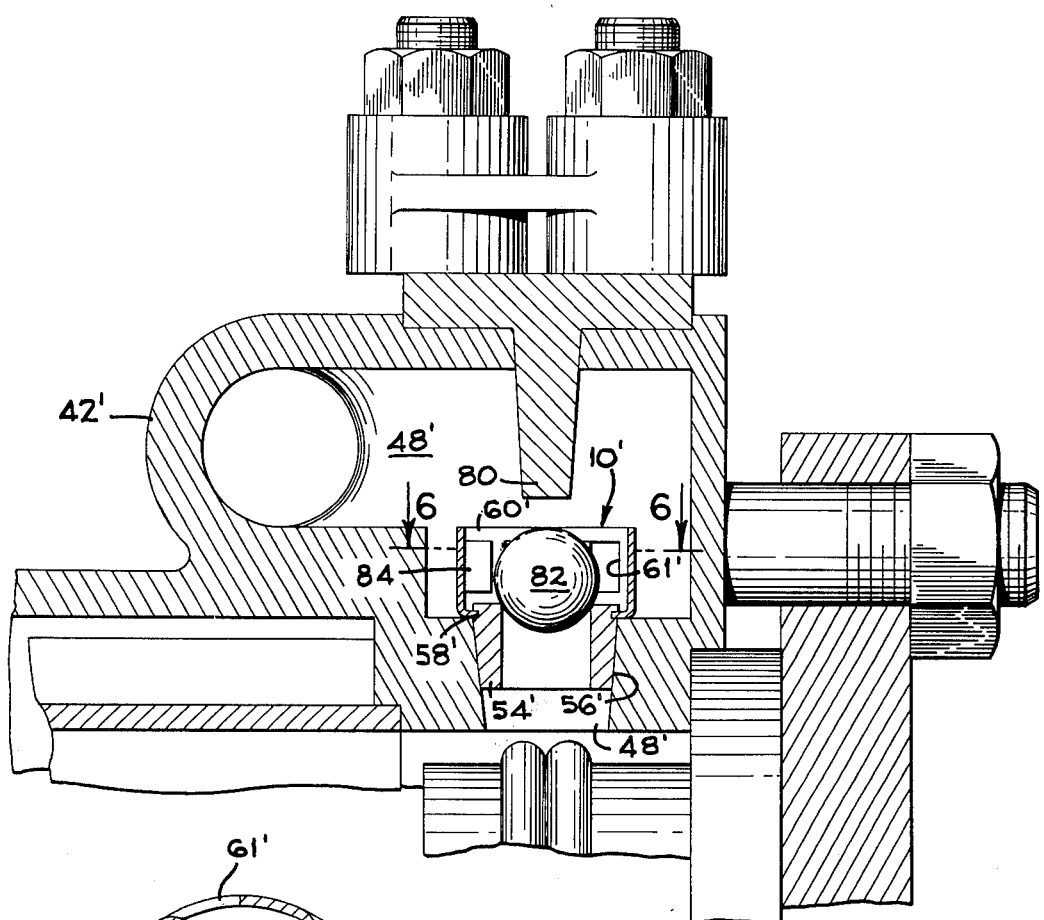
FIG_5
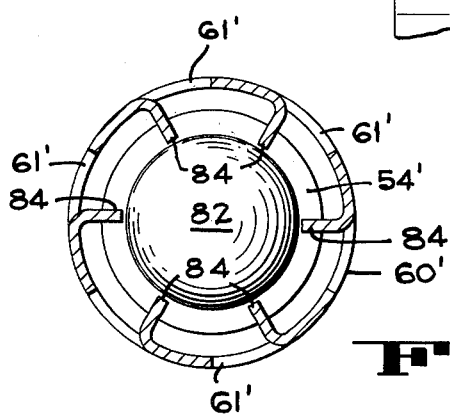
FIG_6

VALVE ASSEMBLY

This is a division of application Ser. No. 309,553 filed Nov. 24, 1972, which application issued to Frederick E. Freiheit on Aug. 20, 1974 as Pat. No. 3,830,255.

BACKGROUND OF THE INVENTION

1. Field of the Invention

This invention pertains to valve assemblies and more particularly relates to valves for high pressure pumps or the like.

2. Description of the Prior Art

High pressure pumps of the type disclosed in U.S. Pat. No. 2,038,747 to Magnuson or Pat. No. 3,030,978 to Griffith et al. frequently pump corrosive or abrasive materials and accordingly the inlet and discharge valve assemblies used in such pumps are made, to a large extent, from corrosive resisting material such as stainless steel which is very difficult to machine.

Normally the valve cage and valve seat of such valve assemblies are either machined from a single piece of solid stock, as in the Magnuson pump, requiring that the high machine cost be absorbed by the manufacture; or the valve cage and valve seat are not permanently attached to each other as in the Griffith et al. pump. In the Griffith et al. pump the several separate valve parts must be laboriously assembled and disassembled each time a valve assembly is put into or removed from the pump.

Also, many of the prior art valve assemblies, such as the Griffith et al valve assemblies, use cylindrically wound helical springs to return the valves to their valve seats. This type of spring has a near constant spring rate and has a long solid height which makes it necessary to provide a longer valve assembly than desirable in order to provide the desired high flow rates.

SUMMARY OF THE INVENTION

The valve assembly of the present invention includes a stainless steel valve seat which requires a minimum of machining, and a stainless steel cage which has windows stamped therein and has one end bent inwardly and press fitted into a groove machined in the outer periphery of the valve seat.

In order to provide a short valve with high lift and high flow rates, a conical spring is disposed between a disc valve having an upturned peripheral flange for retaining the large end of the spring, and a valve retainer having a small diameter centrally disposed opening defined by an annular flange for retaining the small end of the spring. The valve retainer is held within the cage by a snap ring having outwardly projecting lobes which project into the windows formed in the cage.

Since the spring is a conical spring, it has a variable spring rate which minimizes vibrational problems and provides high initial valve closing forces with low final closing forces for quick, low pressure opening of the suction valve. Also, the compressed height of the spring is quite short.

The second embodiment of the valve assembly of the present invention is of the ball type and includes a valve cage bent inwardly and press fitted to a valve seat. The ball is guided by radial flanges which are pressed inwardly from the valve windows during the cage stamping operation.

It is therefore one object of the present invention to provide a valve assembly having a stamped cage bent inwardly and press fitted into a machined valve seat.

Another object is to provide a valve having a conical spring for urging a disc valve toward the valve seat with varying forces.

BRIEF DESCRIPTION OF THE DRAWINGS

FIG. 1 is a vertical central section through a conventional high pressure pump with a pair of valve assemblies of the present invention mounted therein.

FIG. 2 is an enlarged vertical central section of one of the valve assemblies with the valve closed.

FIG. 3 is an enlarged section similar to FIG. 2 but with the valve open.

FIG. 4 is a section taken along lines 4—4 of FIG. 2 illustrating the snap ring connection to the cage.

FIG. 5 is an enlarged vertical section through a portion of a pump similar to the pump of FIG. 1 with a modified form of valve assembly therein.

FIG. 6 is a section taken along lines 6—6 of FIG. 5.

DESCRIPTION OF THE PREFERRED EMBODIMENT

Two of the valve assemblies 10 (FIGS. 2 and 3) of the present invention are illustrated as being used in a high pressure pump 12 to act as an inlet valve 10a (FIG. 1) and a discharge valve 10b.

The pump 12 includes a housing 16 having a drive shaft 18 and a crank shaft 20 journaled thereon. The drive shaft 18 is driven by a belt drive 22, or the like, from a power source (not shown). A pinion 24 keyed on the drive shaft 18 meshes with a large diameter gear 26 keyed on the crank shaft 20 thereby driving the crank shaft and a crank arm connecting rod 28 journaled to the crank shaft. The connecting rod is pivotally connected to a 30 mounted for reciprocation in a sleeve 32 within the housing. One end of a connecting rod 34 is secured to the crosshead 30 and extends into a pump cylinder 36 through a packing gland 38 and has a pump piston 40 connected to its other end. The pump cylinder 36 is fitted within a pump body 42 having an inlet or suction passage 44 connected to a source of fluid by a conduit 46, and a discharge passage 48. Both passages 44 and 48 and the pump cylinder 36 communicate with a pumping chamber 50 which has an access opening opposite the pump cylinder. The access opening is normally closed in fluid tight engagement by an end cap 52. The inlet valve 10a is mounted in the inlet passage 44 and opens to allow a charge of fluid to enter the pumping chamber 50 when the pump piston 40 is moving away from the end cap 52. The discharge valve 10b is mounted in the discharge passage 48 and opens when the pump piston 40 is moved toward the end cap 52 to discharge a portion of the fluid from the pumping chamber 50.

Although the valve assemblies have been disclosed and described as being used in a high pressure pump, it will be understood that such valve assemblies may be used in other apparatus for other fluid controlling purposes.

Each valve assembly 10 (FIGS. 2 and 3) comprises an annular valve seat 54 having a frusto-conical surface 56 and an annular cage retaining groove 58 machined in its outer surface. A valve cage 60 is fabricated from stainless steel tube stock of cylindrical cross-section and has a plurality of fluid flow passages or windows 61 stamped therein. The valve cage 60 is rigidly connected to the valve seat 54 by pressing one end of the cage inwardly to define a generally concave annular flange 62 having its inner edge seated in the retaining groove 58.

A valve disc 64 is fabricated from stainless steel plate stock by first stamping a disc from the stock and thereafter pressing a spring retaining flange 66 upwardly from the periphery of the disc. The finished valve disc 64 is then slidably fitted within the cage with its flat sealing surface resting in sealing engagement with the sealing surface 68 of the valve seat 54. A conical spring 70 is then seated upon the valve disc 64 with its large diameter end guided by the flange 66. The small diameter end of the spring is received around and guided by a flange 72 pressed downwardly (FIG. 2) from a spring retainer 74 that is stamped from stainless steel plate stock and has an outside diameter slightly smaller than the inside diameter of the cage 60.

As best illustrated in FIGS. 2 and 4, the valve disc 64, spring 70, and spring retainer 74 are held in place within the cage 60 by an internal snap ring 76 which includes a plurality of outwardly projecting lobes 78 that are seated within and are urged against the upper edge of certain of the windows 61 when the valve is assembled and is oriented as indicated in FIGS. 2 and 3.

It will be apparent that when two of the valve assemblies 10 are seated in the inlet passage 44 and the discharge passage 48 with their conical surfaces 56 wedged into similar surfaces in the passages 44 and 46 as indicated in FIG. 1, that movement of the piston 40 to the left will cause low pressure fluid to open the inlet valve 10a as indicated in FIG. 3, and close the discharge valve 10b as indicated in FIG. 2 thus drawing a charge of fluid into the pumping chamber 50. When the piston 40 is moving to the right, the inlet valve 10a will be closed by high pressure and the discharge valve 10b will be open to discharge some of the fluid from the pumping chamber 50 for distribution out of the pump through the discharge passage 48.

An important feature of the invention is that the conical spring 70 has its large end disposed against the disc valve 64 making it possible to fully open the valve in a very short distance since the conical spring is capable of telescoping within itself to a very short solid height which is less than twice the wire diameter of the spring. Also, by placing the wide or large diameter end of the spring 70 against the valve seat 64 and within the flange 66, while the small diameter end is guided by the flange 62 of the spring retainer 74, the spring provides very good control over the movement of the valve disc during the pumping operation.

Another important feature of the invention is that the spring's conical section creates a variable rate spring which minimizes vibrational problems in the valve, which problems are inherent in constant rate cylindrical springs. The variable rate conical spring also gives higher return forces when the valve is fully opened as compared to a much lighter force when the valve is near the closed position thus providing for quick low pressure opening of the suction or inlet valve 10a (FIG. 1).

The second embodiment of the valve assembly 10' of the present invention is illustrated in FIGS. 5 and 6 and is of the ball type. The valve 10' is shown mounted in the discharge passage 48' of a pump body 42', which body is quite similar to the pump body disclosed in FIG. 1 except that an abutment 80 is provided for maintaining a ball valve 82 within the valve assembly.

The valve assembly 10' comprises an annular valve seat 54' having a frusto-conical surface 56' and an annular cage retaining groove 58' machined in its outer surface. A valve cage 60' fabricated from stainless steel tube stock has windows 61' stamped therein with the material removed from the windows 61' being pressed substantially radially inward, as indicated in FIG. 6, to define ball guiding flanges 84.

In the second embodiment of the invention, high fluid pressure below the ball valve 82 will lift the ball from its seat, while gravity plus low pressure below the ball will return it to its seat.

From the foregoing description it is apparent that both embodiments of the valve assembly, which is primarily constructed of difficult to machine stainless steel, include a fabricated valve cage bent inwardly and press fitted to an annular valve seat thereby minimizing the amount of machining required. The valve assembly of one embodiment also employs a conical spring having a variable spring rate and positioned so that its large end engages a disc valve to provide a valve assembly of short overall height and with a minimum tendency to chatter during the operation.

Although the best mode contemplated for carrying out the present invention has been herein shown and described, it will be apparent that modification and variation may be made without departing from what is regarded to be the subject matter of the invention.

I claim:

1. A method of forming a valve assembly primarily from difficult to machine stainless steel or the like wherein the valve includes at least an annular valve seat, a valve, and a tubular valve cage having window forming cage material therein comprising; the steps of machining an annular groove in the outer periphery of said valve seat, stamping a plurality of fluid flow windows into said valve cage, press fitting said cage on said valve seat by forming an inwardly curved flange on one end of the valve cage with the inner end of said flange terminating in said annular groove, said cage material which is removed to form said windows remaining attached to one edge of the associated windows, and pressing said window forming cage material substantially radially inward to act as a guide for said valve.

* * * * *

UNITED STATES PATENT OFFICE
CERTIFICATE OF CORRECTION

Patent No. 3,916,496　　　　　　　　Dated November 4, 1975

Inventor(s) FREDERICK E. FREIHEIT

It is certified that error appears in the above-identified patent and that said Letters Patent are hereby corrected as shown below:

Column 2, line 37; before "30" insert -- crosshead --.

Signed and Sealed this fourth Day of May 1976

[SEAL]

Attest:

RUTH C. MASON
*Attesting Officer*

C. MARSHALL DANN
*Commissioner of Patents and Trademarks*